(12) United States Patent
Suehiro et al.

(10) Patent No.: US 12,309,020 B2
(45) Date of Patent: May 20, 2025

(54) MANAGEMENT DEVICE, REMOTE OPERATION SYSTEM, AND MANAGEMENT METHOD

(71) Applicant: TOYOTA JIDOSHA KABUSHIKI KAISHA, Toyota (JP)

(72) Inventors: Yuki Suehiro, Ichikawa (JP); Toshinobu Watanabe, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/098,253

(22) Filed: Jan. 18, 2023

(65) Prior Publication Data

US 2023/0261927 A1     Aug. 17, 2023

(30) Foreign Application Priority Data

Feb. 14, 2022   (JP) ................. 2022-020475

(51) Int. Cl.
*H04L 41/0604* (2022.01)
*H04L 67/125* (2022.01)

(52) U.S. Cl.
CPC ........ *H04L 41/0604* (2013.01); *H04L 67/125* (2013.01)

(58) Field of Classification Search
CPC .......................... H04L 41/0604; H04L 67/125
See application file for complete search history.

(56) References Cited

U.S. PATENT DOCUMENTS

| | | | |
|---|---|---|---|
| 2018/0364705 A1 | 12/2018 | Yunoki et al. | |
| 2020/0106903 A1* | 4/2020 | Ogawa | H04N 1/32678 |
| 2021/0347329 A1 | 11/2021 | Mori et al. | |
| 2022/0242447 A1* | 8/2022 | Nagura | B60W 50/0098 |

FOREIGN PATENT DOCUMENTS

| | | | | |
|---|---|---|---|---|
| CN | 109891470 | * | 6/2019 | |
| CN | 109641569 | * | 7/2020 | |
| CN | 109641569 B | * | 7/2020 | ......... B60R 16/0231 |
| CN | 109891470 B | * | 3/2022 | ........... G05D 1/0022 |
| JP | 2019003403 | * | 6/2017 | |
| JP | 2018-506800 A | | 3/2018 | |

(Continued)

*Primary Examiner* — James E Springer
*Assistant Examiner* — Patrick F Ngankam
(74) *Attorney, Agent, or Firm* — Sughrue Mion, PLLC

(57) ABSTRACT

A management device communicates with a moving body being a target of a remote operation performed by a remote operator and a remote operator terminal on the remote operator side. During the remote operation of the moving body, the management device receives first information related to the remote operation from a first device that is one of the moving body and the remote operator terminal, and transmits the first information to a second device that is another of the moving body and the remote operator terminal. The management device determines whether an abnormality occurs in a first communication from the first device to the management device based on a communication state of the first information. When it is determined that the abnormality occurs in the first communication, the management device notifies the first device of occurrence of the abnormality in the first communication.

12 Claims, 13 Drawing Sheets

(56) References Cited

FOREIGN PATENT DOCUMENTS

| | | |
|---|---|---|
| JP | 2018-077649 A | 5/2018 |
| JP | 2019-3403 A | 1/2019 |
| JP | 2020-057160 A | 4/2020 |
| JP | 2021-061516 A | 4/2021 |
| JP | 2021-68132 A | 4/2021 |
| WO | 2016/154938 A1 | 10/2016 |
| WO | WO-2018025802 A1 * | 2/2018 ............. B60R 16/02 |
| WO | WO-2019087835 A1 * | 5/2019 .......... B66F 9/07581 |
| WO | 2020/157942 A1 | 8/2020 |

* cited by examiner

1: REMOTE OPERATION SYSTEM

MANAGEMENT DEVICE, REMOTE OPERATION SYSTEM, AND MANAGEMENT METHOD

CROSS-REFERENCE TO RELATED APPLICATION

This application claims priority to Japanese Patent Application No. 2022-020475 filed on Feb. 14, 2022, the entire contents of which are incorporated by reference herein.

BACKGROUND

Technical Field

The present disclosure relates to a remote operation of a moving body performed by a remote operator.

Background Art

Patent Literature 1 discloses a vehicle remote operation device for remotely operating a vehicle. The vehicle remote operation device includes an operator operation unit outputting an operation signal for remotely operating the vehicle, and a plurality of control units receiving the operation signal output from the operator operation unit. Each control unit transmits the received operation signal to an operation information determination unit. When operation contents of the operation signals received from the plurality of control units are consistent with each other, the operation information determination unit transmits the operation signal to the vehicle. On the other hand, when the operation contents of the operation signals received from the plurality of control units are not consistent with each other, the operation information determination unit restricts transmission of the operation signal to the vehicle.

In addition, techniques related to a remote operation of a vehicle are disclosed in Patent Literature 2, Patent Literature 3, and Patent Literature 4.

LIST OF RELATED ART

Patent Literature 1: Japanese Laid-Open Patent Application Laid-Open No. JP-2021-061516
Patent Literature 2: Japanese Laid-Open Patent Application No. JP-2018-506800
Patent Literature 3: International Publication No. WO2020/157942
Patent Literature 4: Japanese Laid-Open Patent Application No. JP-2018-077649

SUMMARY

A remote operation of a moving body (e.g., a vehicle, a robot) performed by a remote operator is considered. During the remote operation of the moving body, a communication is performed between the moving body and a remote operator terminal on the remote operator side. When a communication abnormality occurs, it is desirable to make a quick response in order to secure safety.

An object of the present disclosure is to provide a technique enabling a quick response to a communication abnormality that occurs during a remote operation of a moving body.

A first aspect is directed to a management device that communicates with a moving body being a target of a remote operation performed by a remote operator and a remote operator terminal on a side of the remote operator.

The management device includes one or more processors. The one or more processors are configured to:

during the remote operation of the moving body, receive first information related to the remote operation from a first device that is one of the moving body and the remote operator terminal, and transmit the first information to a second device that is another of the moving body and the remote operator terminal;

execute a communication abnormality determination process that determines whether or not an abnormality occurs in a first communication from the first device to the management device based on a communication state of the first information; and when it is determined that the abnormality occurs in the first communication, notify the first device of occurrence of the abnormality in the first communication.

A second aspect is directed to a remote operation system. The remote operation system includes:

a moving body being a target of a remote operation performed by a remote operator;
a remote operator terminal on a side of the remote operator; and
a management device configured to communicate with the moving body and the remote operator terminal.

The management device is further configured to:

during the remote operation of the moving body, receive first information related to the remote operation from a first device that is one of the moving body and the remote operator terminal, and transmit the first information to a second device that is another of the moving body and the remote operator terminal;

execute a first communication abnormality determination process that determines whether or not an abnormality occurs in a first communication from the first device to the management device based on a communication state of the first information; and when it is determined that the abnormality occurs in the first communication, notify the first device of occurrence of the abnormality in the first communication.

A third aspect is directed to a management method for managing a remote operation system including a moving body being a target of a remote operation performed by a remote operator and a remote operator terminal on a side of the remote operator.

The management method includes:

during the remote operation of the moving body, transmitting first information related to the remote operation from a first device that is one of the moving body and the remote operator terminal to a management device, and further transmitting the first information from the management device to a second device that is another of the moving body and the remote operator terminal;

executing, by the management device, a communication abnormality determination process that determines whether or not an abnormality occurs in a first communication from the first device to the management device based on a communication state of the first information; and when it is determined that the abnormality occurs in the first communication, notifying, by the management device, the first device of occurrence of the abnormality in the first communication.

According to the present disclosure, the management device between the moving body and the remote operator terminal has the function of determining whether or not the communication abnormality occurs. Then, the management

EMBODIMENTS

Embodiments of the present disclosure will be described with reference to the accompanying drawings.

1. Overview of Remote Operation System

A remote operation (remote driving) of a moving body is considered. Examples of the moving body being a target of the remote operation include a vehicle, a robot, a flying object, and the like. The vehicle may be an autonomous driving vehicle or may be a vehicle driven by a driver. Examples of the robot include a logistics robot, a work robot, and the like. Examples of the flying object include an airplane, a drone, and the like.

As an example, in the following description, a case where the moving body being the target of the remote operation is a vehicle will be considered. When generalizing, "vehicle" in the following description shall be deemed to be replaced with "moving body."

Figure 1:
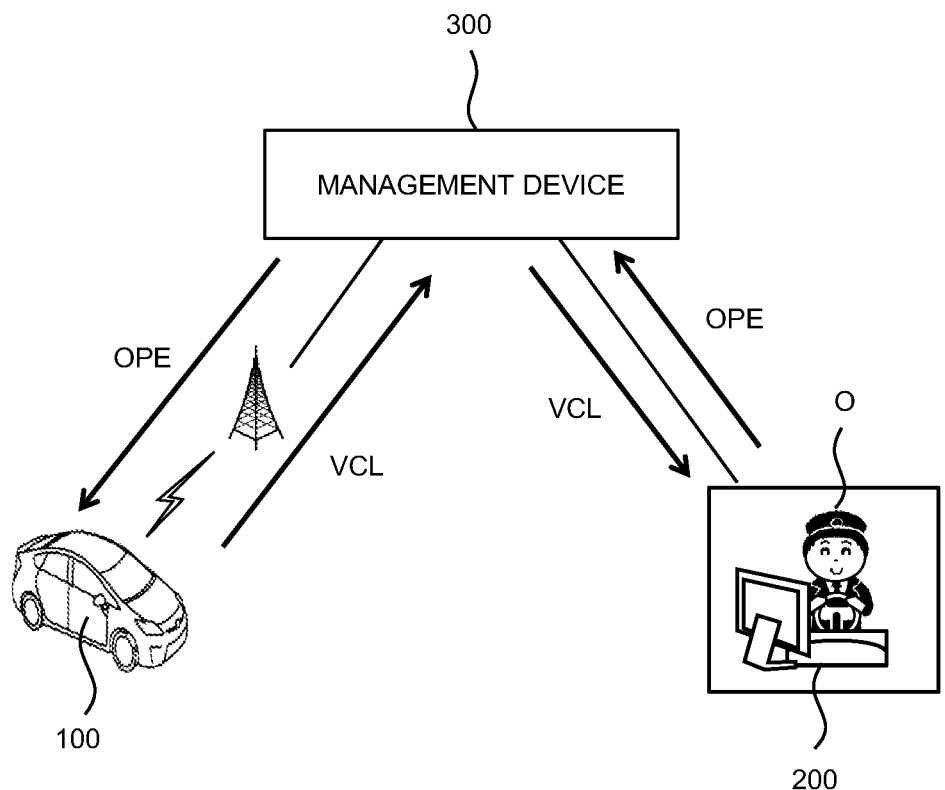
FIG. 1 is a schematic diagram showing a configuration example of a remote operation system according to an embodiment of the present disclosure.

FIG. 1 is a schematic diagram showing a configuration example of a remote operation system 1 according to the present embodiment. The remote operation system 1 includes a vehicle 100, a remote operator terminal 200, and a management device 300. The vehicle 100 is the target of the remote operation. The remote operator terminal 200 is a terminal device used by a remote operator O when remotely operating the vehicle 100. The remote operator terminal 200 can also be referred to as a remote operation human machine interface (HMI). The management device 300 manages the remote operation system 1. The management of the remote operation system 1 includes, for example, assigning a remote operator O to a vehicle 100 that requires the remote operation. The management device 300 is able to communicate with the vehicle 100 and the remote operator terminal 200 via a communication network. Typically, the management device 300 is a management server on a cloud. The management server may be configured by a plurality of servers that perform distributed processing.

Various sensors including a camera are installed on the vehicle 100. The camera images a situation around the vehicle 100 to acquire image information indicating the situation around the vehicle 100. Vehicle information VCL is information acquired by the various sensors and includes the image information captured by the camera. The vehicle 100 transmits the vehicle information VCL to the remote operator terminal 200 via the management device 300. That is, the vehicle 100 transmits the vehicle information VCL to the management device 300, and the management device 300 transfers the received vehicle information VCL to the remote operator terminal 200.

The remote operator terminal 200 receives the vehicle information VCL transmitted from the vehicle 100. The remote operator terminal 200 presents the vehicle information VCL to the remote operator O. More specifically, the remote operator terminal 200 includes a display device, and displays the image information and the like on the display device. The remote operator O views the displayed information, recognizes the situation around the vehicle 100, and performs remote operation of the vehicle 100. The remote operation information OPE is information relating to remote operation by the remote operator O. For example, the remote operation information OPE includes an amount of operation performed by the remote operator O. The remote operator terminal 200 transmits the remote operation information OPE to the vehicle 100 via the management device 300. That is, the remote operator terminal 200 transmits the remote operation information OPE to the management device 300, and the management device 300 transfers the received remote operation information OPE to the vehicle 100.

The vehicle 100 receives the remote operation information OPE transmitted from the remote operator terminal 200. The vehicle 100 performs vehicle travel control in accordance with the received remote operation information OPE. In this manner, the remote operation of the vehicle 100 is realized.

Figure 2:
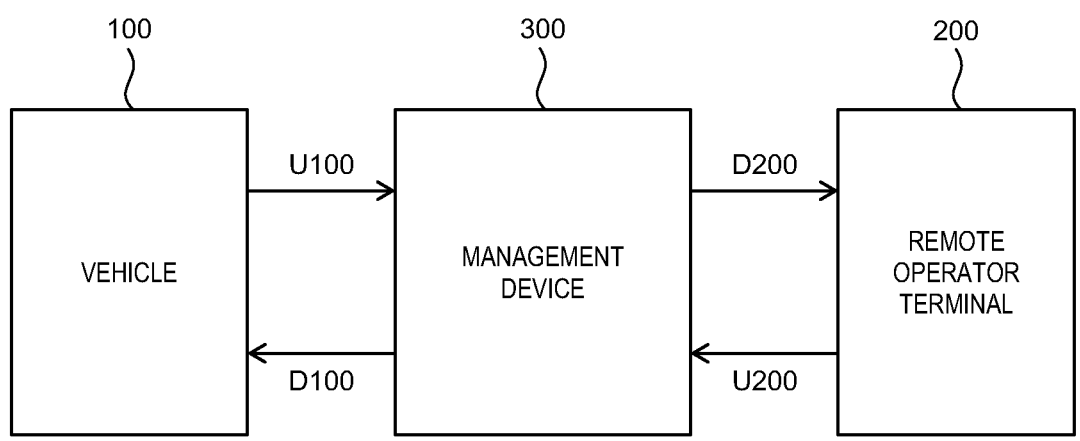
FIG. 2 is a conceptual diagram for explaining a communication between a vehicle, a management device, and a remote operator terminal.

FIG. 2 is a conceptual diagram for explaining terms used in the following description. For convenience sake, the communication of the vehicle information VCL from the vehicle 100 to the management device 300 is referred to as an "uplink communication U100", and the communication of the remote operation information OPE from the management device 300 to the vehicle 100 is referred to as a "downlink communication D100." Similarly, the communication of the remote operation information OPE from the remote operator terminal 200 to the management device 300 is referred to as an "uplink communication U200", and the communication of the vehicle information VCL from the management device 300 to the remote operator terminal 200 is referred to as a "downlink communication D200."

2. Communication Abnormality Determination Process and Abnormality Notification Process The remote operation system 1 according to the present embodiment has an "abnormality determination function (abnormality detection function)" that determines whether or not an abnormality occurs. Examples of the abnormality in the remote operation system 1 include an abnormality in the vehicle 100, an abnormality in the remote operator terminal 200, and an abnormality in the communication. Hereinafter, the "communication abnormality" will be considered in particular. When the communication abnormality occurs during the remote operation of the vehicle 100, it is desirable to make a quick response in order to secure safety.

Figure 3:
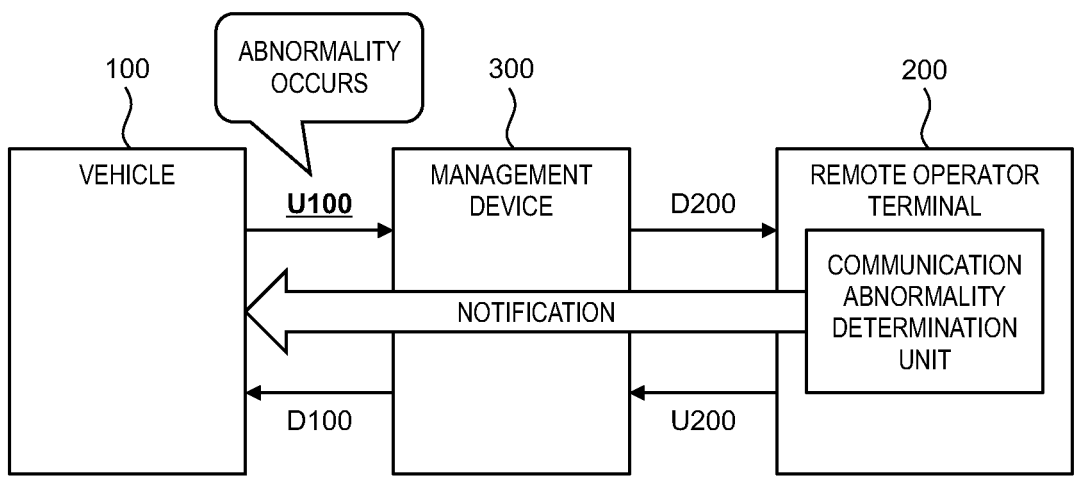
FIG. 3 is a conceptual diagram for explaining a comparative example.

FIG. 3 shows a comparative example. The remote operator device 200 determines whether or not an abnormality occurs in the communication from the vehicle 100 to the remote operator device 200, based on a communication state of the vehicle information VCL received from the vehicle 100 (communication abnormality determination process). For example, when an abnormality occurs in the uplink communication U100, the remote operator station 200 detects that an abnormality occurs somewhere in the communication from the vehicle 100 to the remote operator station 200. When detecting the communication abnormality, the remote operator terminal 200 notifies (feeds back) the occurrence of the communication abnormality to the management device 300 and the vehicle 100 (abnormality notification process). Upon receiving the notification, the management device 300 and the vehicle 100 take measures to secure safety. For example, the vehicle 100 performs evacuation control to evacuate and stop at a safe position.

However, in the case of the comparative example, it takes a relatively long time to feed back the occurrence of the communication abnormality to the communication partner. In addition, it is not possible to finely identify a location of the occurrence of the communication abnormality. In view of the above, the present embodiment proposes a technique capable of more quickly feeding back the occurrence of the communication abnormality to the communication partner.

2-1. First Example

Figure 4:
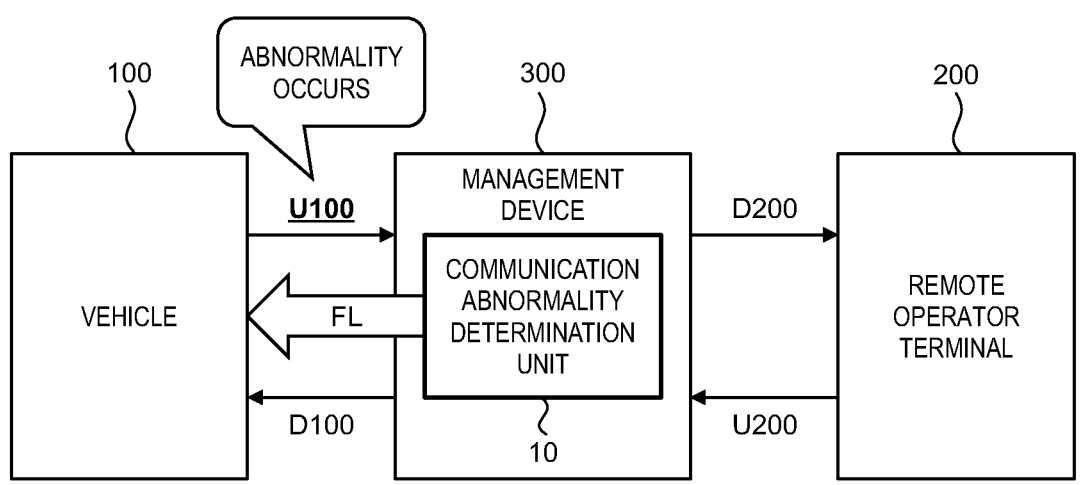
FIG. 4 is a conceptual diagram for explaining a first example of a communication abnormality determination process and an abnormality notification process according to an embodiment of the present disclosure.
Figure 5:
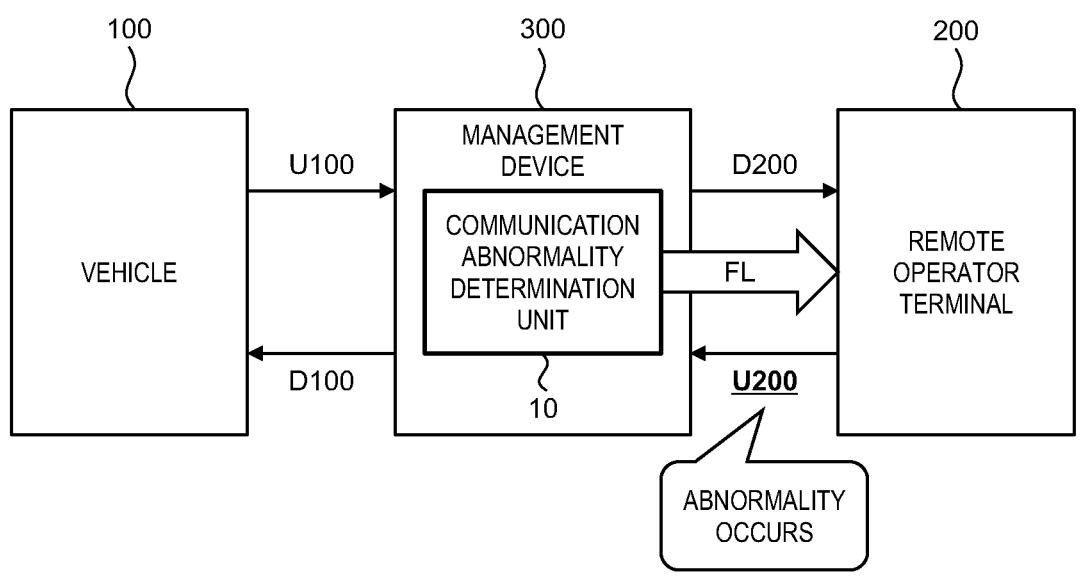
FIG. 5 is a conceptual diagram for explaining a first example of a communication abnormality determination process and an abnormality notification process according to an embodiment of the present disclosure.

FIGS. 4 and 5 are conceptual diagrams for explaining a first example. According to the first example, the management device 300 includes a "communication abnormality determination unit 10."

In the example shown in FIG. 4, the communication abnormality determination unit 10 determines whether or not an abnormality occurs in the uplink communication U100 from the vehicle 100 to the management device 300, based on a communication state of the vehicle information VCL received from the vehicle 100 (communication abnormality determination process). A specific example of the communication abnormality determination process will be described later (see Section 2-4).

A communication abnormality flag FL is information indicating a result of the communication abnormality determination process. When it is determined that no communication abnormality occurs, that is, when no communication abnormality is detected, the communication abnormality flag FL is set to, for example, "0." On the other hand, when it is determined that the communication abnormality occurs, that is, when the communication abnormality is detected, the communication abnormality flag FL is set to, for example, "1."

When at least the abnormality in the uplink communication U100 is detected, the communication abnormality determination unit 10 notifies (feeds back) the communication abnormality flag FL indicating the occurrence of the abnormality in the uplink communication U100 to the vehicle 100 being the communication partner (abnormality notification process).

In this manner, the occurrence of the abnormality in the uplink communication U100 is fed back to the vehicle 100 as quickly as possible. It is thus possible to make a quick response to the occurrence of the abnormality in the uplink communication U100. For example, the vehicle 100 is able to perform the evacuation control at an earlier timing. As a result, safety is improved.

In the example shown in FIG. 5, the communication abnormality determination unit 10 determines whether or not an abnormality occurs in the uplink communication U200 from the remote operator terminal 200 to the management device 300, based on a communication state of the remote operation information OPE received from the remote operator terminal 200 (communication abnormality determination process). When at least the abnormality in the uplink communication U200 is detected, the communication abnormality determination unit 10 notifies (feeds back) the communication abnormality flag FL indicating the occurrence of the abnormality in the uplink communication U200 to the remote operator terminal 200 being the communication partner (abnormality notification process).

In this manner, the occurrence of the abnormality in the uplink communication U200 is fed back to the remote operator terminal 200 as quickly as possible. It is thus possible to make a quick response to the occurrence of the abnormality in the uplink communication U200. For example, the remote operator O is able to instruct the vehicle 100 to execute the evacuation control at an earlier timing. As a result, safety is improved.

Generalization is as follows. A "first device" is one of the vehicle 100 and the remote operator terminal 200, and a "second device" is the other of the vehicle 100 and the remote operator terminal 200. During the remote operation of the vehicle 100, the management device 300 receives first information (i.e., the vehicle information VCL or the remote operation information OPE) related to the remote operation from the first device, and transmits the first information to the second device. The communication abnormality determination unit 10 of the management device 300 determines whether or not an abnormality occurs in a first communication (i.e., U100 or U200) from the first device to the management device 300, based on a communication state of the first information received from the first device (communication abnormality determination process). When it is determined that the abnormality occurs in the first communication, the communication abnormality determination unit 10 of the management device 300 notifies the first device of the occurrence of the abnormality in the first communication (abnormality notification process).

As described above, according to the first example, the management device 300 between the vehicle 100 and the remote operator terminal 200 has the function of determining whether or not the communication abnormality occurs. Then, the management device 300 notifies the communication partner of the occurrence of the communication abnormality. As a result, the occurrence of the communication abnormality is quickly notified to the communication partner. It is thus possible to make a quick response to the occurrence of the communication abnormality. As a result, a more secure remote operation system 1 is achieved.

Furthermore, according to the first example, it is possible to determine that a location of the occurrence of the abnormality is the uplink communication U100 or the uplink communication U200. That is, it is possible to more finely identify the location of the occurrence of the abnormality.

2-2. Second Example

Figure 6:
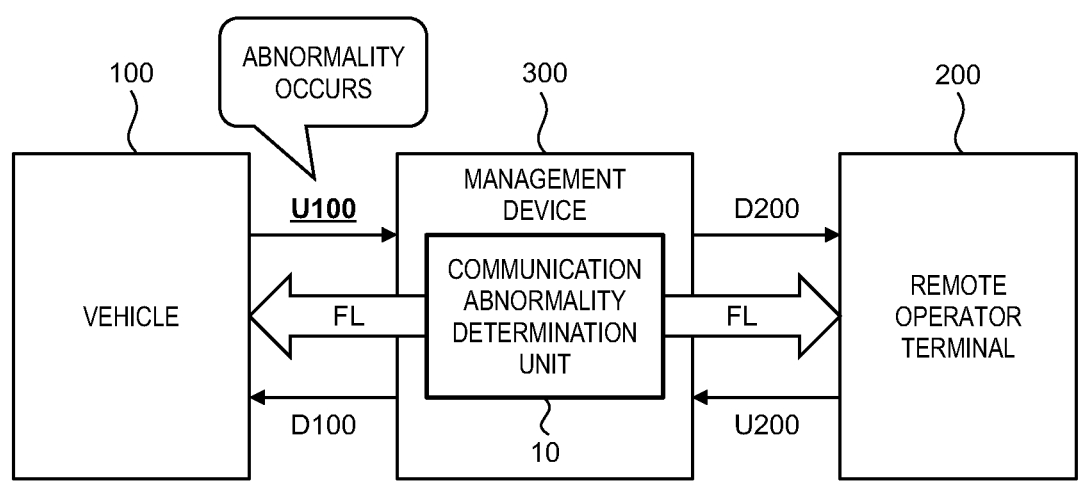
FIG. 6 is a conceptual diagram for explaining a second example of a communication abnormality determination process and an abnormality notification process according to an embodiment of the present disclosure.
Figure 7:
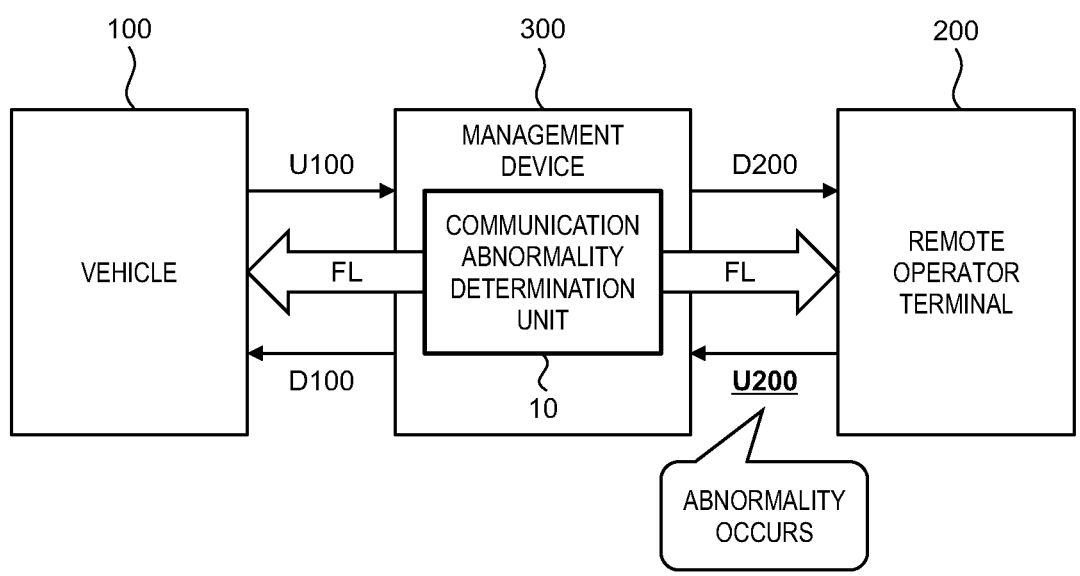
FIG. 7 is a conceptual diagram for explaining a second example of a communication abnormality determination process and an abnormality notification process according to an embodiment of the present disclosure.

FIGS. 6 and 7 are conceptual diagrams for explaining a second example. A description overlapping with the first example described above will be omitted as appropriate.

An example shown in FIG. 6 is a modification of the example shown in FIG. 4. When at least the abnormality in the uplink communication U100 is detected, the communication abnormality determination unit 10 notifies not only the vehicle 100 but also the remote operator terminal 200 of the communication abnormality flag FL indicating the occurrence of the abnormality in the uplink communication U100.

An example shown in FIG. 7 is a modification of the example shown in FIG. 5. When at least the abnormality in the uplink communication U200 is detected, the communication abnormality determination unit 10 notifies not only the remote operator terminal 200 but also the vehicle 100 of the communication abnormality flag FL indicating the occurrence of the abnormality in the uplink communication U200.

As described above, according to the second example, the occurrence of the communication abnormality is quickly notified not only to the first device on the transmission side but also to the second device on the reception side. It is therefore possible to make a quick response to the occurrence of the communication abnormality. As a result, a more secure remote operation system 1 is achieved.

2-3. Third Example

Figure 8:
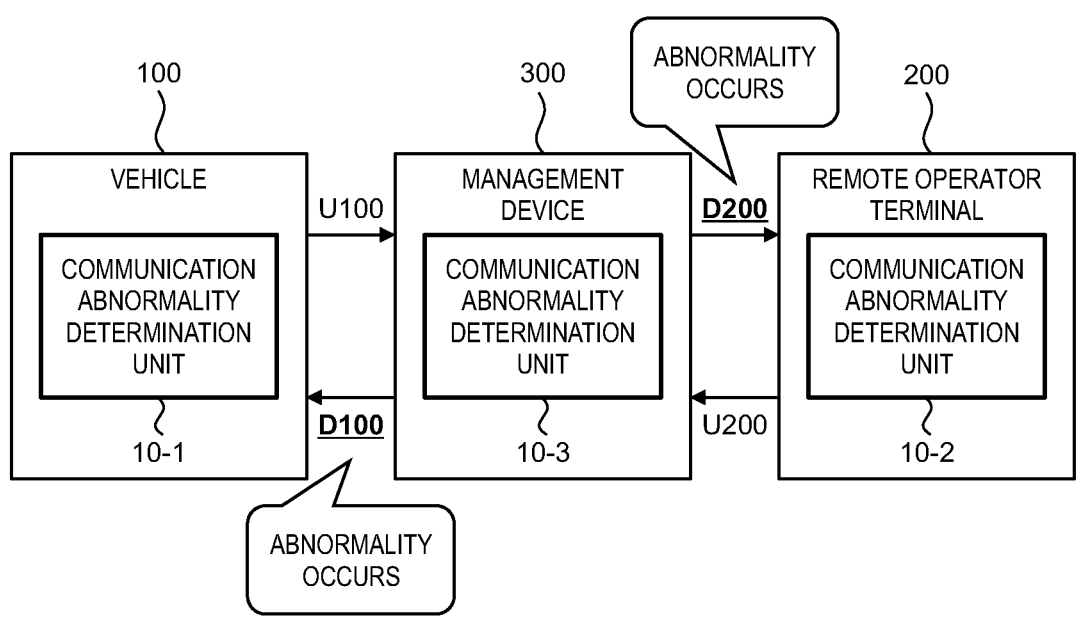
FIG. 8 is a conceptual diagram for explaining a second example of a communication abnormality determination process and an abnormality notification process according to an embodiment of the present disclosure.

FIG. 8 is a conceptual diagram for explaining a third example. According to the third example, each of the vehicle 100, the remote operator terminal 200, and the management device 300 includes the communication abnormality determination unit 10. For convenience sake, the communication abnormality determination unit 10 of the vehicle 100 is referred to as a communication abnormality determination unit 10-1. The communication abnormality determination unit 10 of the remote operator terminal 200 is referred to as a communication abnormality determination unit 10-2. The communication abnormality determination unit 10 of the management device 300 is referred to as a communication abnormality determination unit 10-3.

The communication abnormality determination unit 10-3 of the management device 300 is the same as the communication abnormality determination unit 10 described in the first example or the second example. That is, the communication abnormality determination unit 10-3 determines whether or not an abnormality occurs in the first communication (i.e., U100 or U200) from the first device to the management device 300, based on the communication state of the first information received from the first device (first communication abnormality determination process). When it is determined that the abnormality occurs in the first communication, the communication abnormality determination unit 10-3 notifies the first device or both the first device and the second device of the occurrence of the abnormality in the first communication (first abnormality notification process).

The communication abnormality determination unit 10-1 of the vehicle 100 determines whether or not an abnormality occurs in the downlink communication D100 from the management device 300 to the vehicle 100, based on a communication state of the remote operation information OPE received from the management device 300 (second communication abnormality determination process). When at least the abnormality in the downlink communication D100 is detected, the communication abnormality determination unit 10-1 notifies the management device 300 of the communication abnormality flag FL indicating the occurrence of the abnormality in the downlink communication D100 (second abnormality notification process). Further, the management device 300 may notify the remote operator terminal 200 of the communication abnormality flag FL.

The communication abnormality determination unit 10-2 of the remote operator device 200 determines whether or not an abnormality occurs in the downlink communication D200 from the management device 300 to the remote operator device 200, based on a communication state of the vehicle information VCL received from the management device 300 (second communication abnormality determination process). When at least the abnormality in the downlink communication D200 is detected, the communication abnormality determination unit 10-2 notifies the management device 300 of the communication abnormality flag FL indicating the occurrence of the abnormality in the downlink communication D200 (second abnormality notification process). Further, the management device 300 may notify the vehicle 100 of the communication abnormality flag FL.

Generalization is as follows. During the remote operation of the vehicle 100, the management device 300 receives the first information (i.e., the vehicle information VCL or the remote operation information OPE) related to the remote operation from the first device, and transmits the first information to the second device. The communication abnormality determination unit 10 of the second device determines whether or not an abnormality occurs in a second communication (i.e., D100 or D200) from the management device 300 to the second device, based on a communication state of the first information received from the management device 300 (second communication abnormality determination process). When it is determined that the abnormality occurs in the second communication, the communication abnormality determination unit 10 of the second device notifies at least the management device 300 of the occurrence of the abnormality in the second communication (second abnormality notification process).

According to the third example, the same effects as in the case of the first example or the second example can be obtained. Further, it is possible to determine which of the uplink communication U100, the uplink communication U200, the downlink communication D100, and the downlink communication D200 is the location of the occurrence of the abnormality. That is, it is possible to further finely identify the location of the occurrence of the abnormality.

2-4. Example of Communication Abnormality Determination Process

Figure 9:
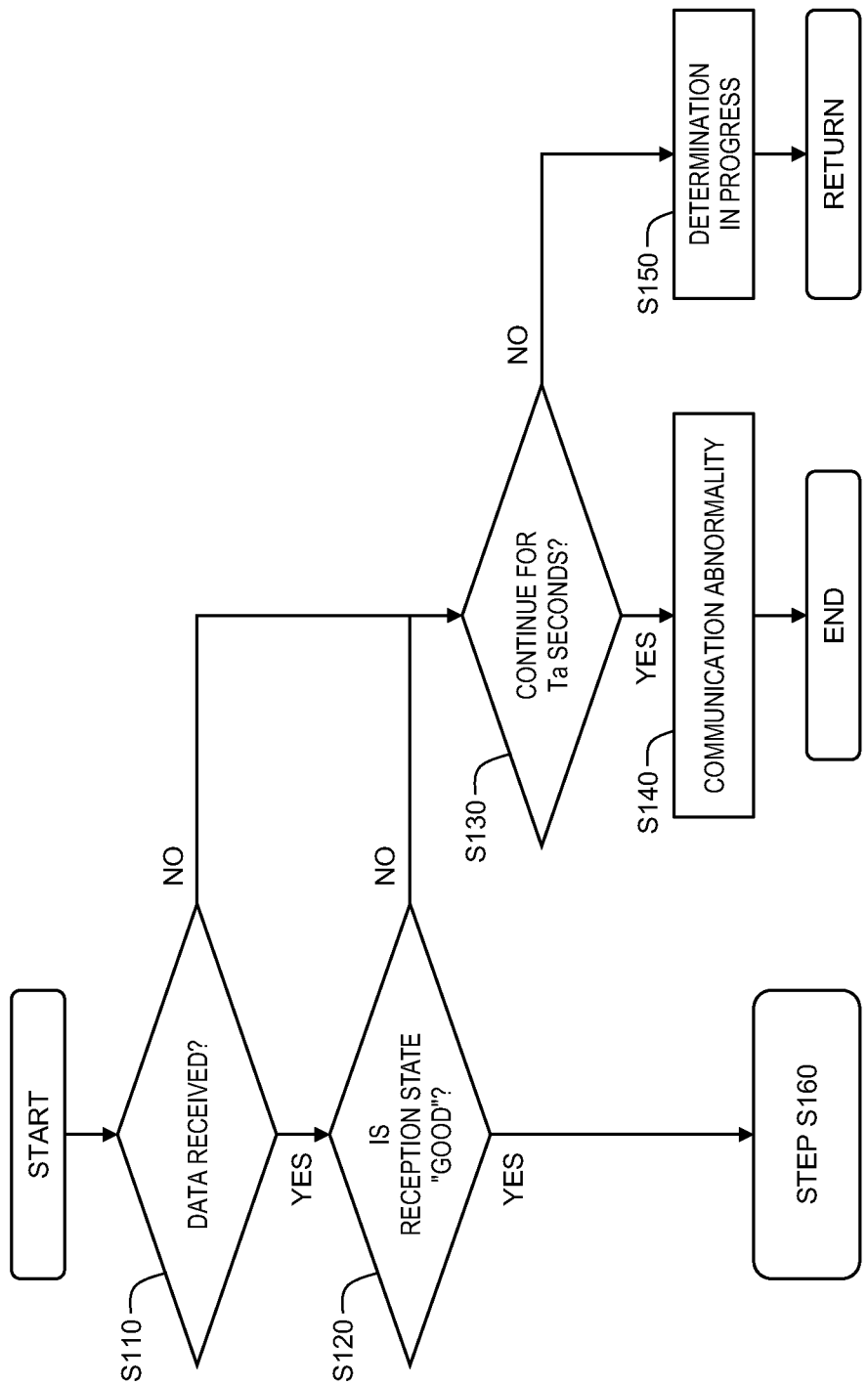
FIG. 9 is a flowchart showing an example of a communication abnormality determination process according to an embodiment of the present disclosure.

FIG. 9 is a flowchart showing an example of the communication abnormality determination process performed by the communication abnormality determination unit 10. As an example, the communication abnormality determination unit 10-3 of the management device 300 is considered. The same applies to the communication abnormality determination unit 10-1 of the vehicle 100 and the communication abnormality determination unit 10-2 of the remote operator terminal 200.

In Step S110, the communication abnormality determination unit 10 determines whether or not the management device 300 receives data. When data are received (Step S110; Yes), the processing proceeds to Step S120. Otherwise (Step S110; No), the processing proceeds to Step S130.

In Step S120, the communication abnormality determination unit 10 determines whether a reception state is good or not. The reception state is represented by a parameter such as the transmission speed, the radio wave reception intensity, and the like. When the parameter is equal to or greater than a predetermined threshold (Step S120; Yes), it is determined that the reception state is good, and the processing proceeds to Step S160. Otherwise (Step S120; No), the processing proceeds to Step S130.

In Step S130, the communication abnormality determination unit 10 determines whether or not the non-data reception state or the not-good reception state continues for Ta seconds. When such the bad state continues for Ta seconds (Step S130; Yes), the processing proceeds to Step S140. On the other hand, when such the bad state has not yet continued for Ta seconds (Step S130; No), the processing proceeds to Step S150.

In Step S140, the communication abnormality determination unit 10 determines (asserts) that the communication abnormality occurs.

In Step S150, the communication abnormality determination unit 10 sets a current state to "communication abnormality determination in progress" without confirming the determination. After that, the processing returns to Step S110.

Figure 10:
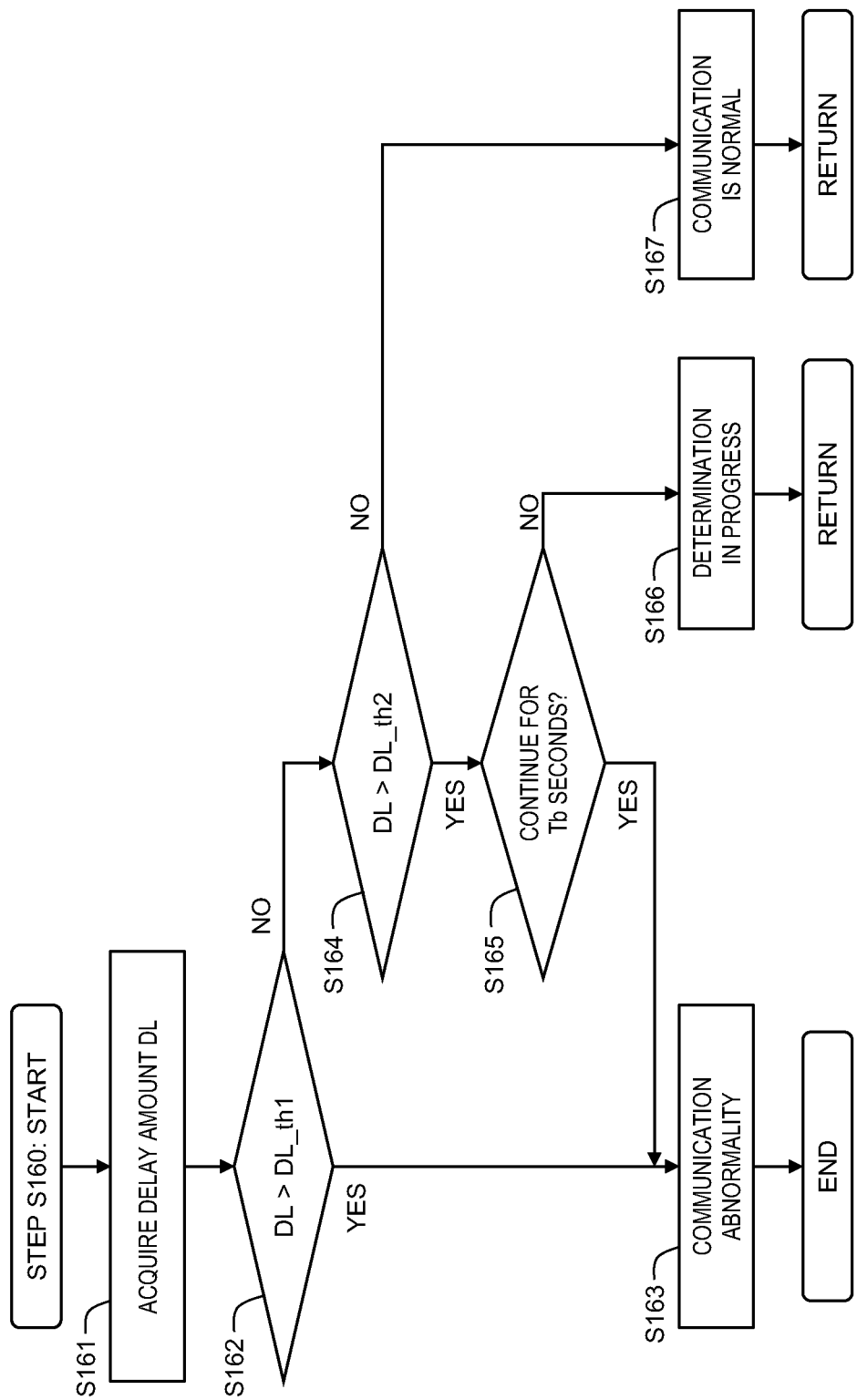
FIG. 10 is a flowchart showing an example of a communication abnormality determination process according to an embodiment of the present disclosure.

FIG. 10 is a flowchart showing an example of Step S160. In Step S160, a delay amount DL of the communication is taken into consideration.

In Step S161, the communication abnormality determination unit 10 acquires information on the delay amount DL of the communication based on reception information received from the communication partner.

In Step S162, the communication abnormality determination unit 10 determines whether or not the delay amount DL exceeds a first threshold value DL_th1. The first threshold value DL_th1 is a delay amount DL where it can be determined that the communication abnormality occurs. For example, the first threshold value DL_th1 is a delay amount DL that cannot normally occur. When the delay amount DL exceeds the first threshold value DL_th1 (Step S162; Yes), the processing proceeds to Step S163. On the other hand, when the delay amount DL is equal to or less than the first threshold value DL_th1 (Step S162; No), the processing proceeds to Step S164.

In Step S163, the communication abnormality determination unit 10 determines (asserts) that the communication abnormality occurs.

In Step S164, the communication abnormality determination unit 10 determines whether or not the delay amount DL exceeds a second threshold value DL_th2. The second threshold value DL_th2 is smaller than the first threshold value DL_th1 described above. For example, the second threshold value DL_th2 is an upper limit value of an allowable range of the delay amount DL. When the delay amount DL exceeds the second threshold value DL_th2 (Step S164; Yes), the processing proceeds to Step S165. On the other hand, when the delay amount DL is equal to or less than the second threshold value DL_th2 (Step S164; No), the processing proceeds to Step S167.

In Step S165, the communication abnormality determination unit 10 determines whether or not the state in which the delay amount DL exceeds the second threshold value DL_th2 continues for Tb seconds. When such the state continues for Tb seconds (Step S165; Yes), the processing proceeds to Step S163. On the other hand, when such the state has not yet continued for Tb seconds (Step S165; No), the processing proceeds to Step S166.

In Step S166, the communication abnormality determination unit 10 sets the current state to "communication abnormality determination in progress" without confirming the determination. After that, the processing returns to Step S110.

In Step S167, the communication abnormality determination unit 10 determines that no communication abnormality occurs and the communication is normal. After that, the processing returns to Step S110.

3. Example of Vehicle

3-1. Configuration Example

Figure 11:
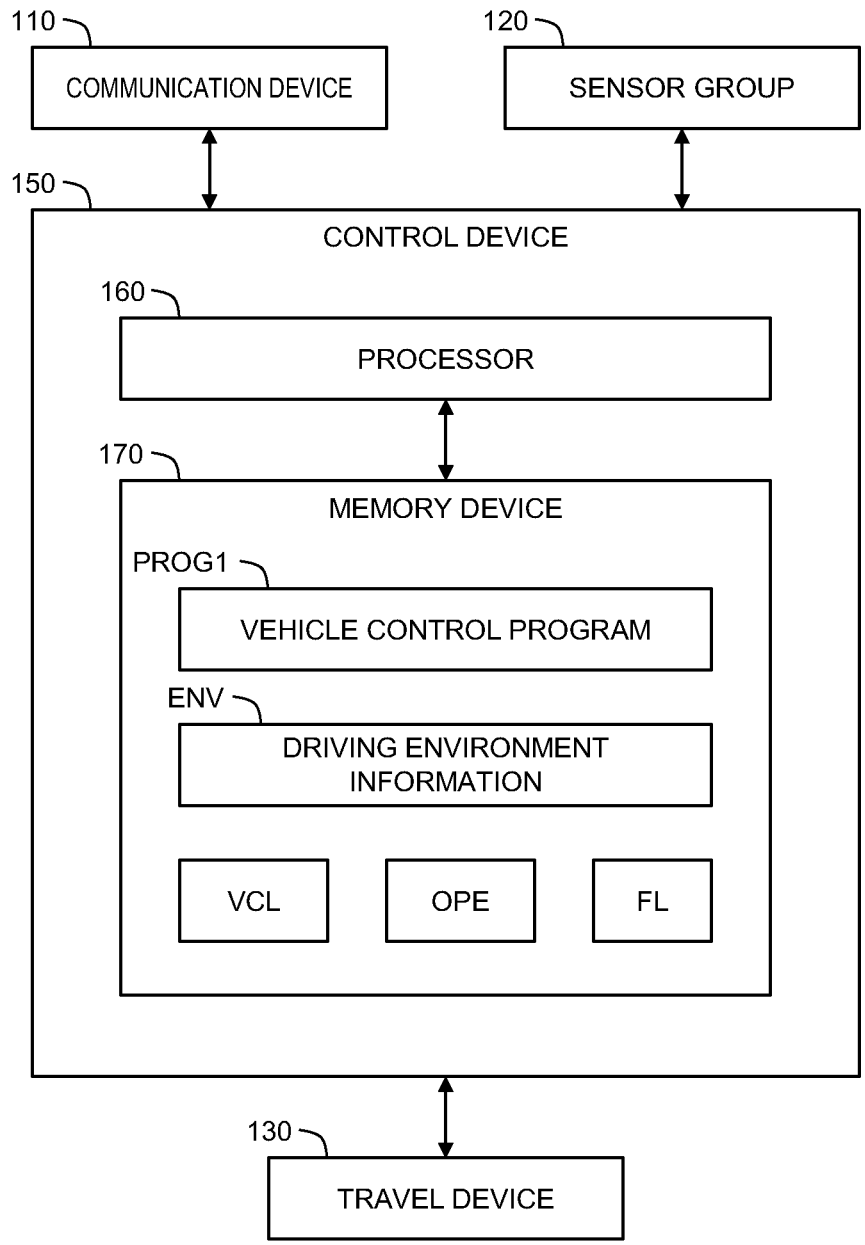
FIG. 11 is a block diagram showing a configuration example of a vehicle according to an embodiment of the present disclosure.

FIG. 11 is a block diagram showing a configuration example of the vehicle 100. The vehicle 100 includes a communication device 110, a sensor group 120, a travel device 130, and a control device (controller) 150.

The communication device 110 communicates with the outside of the vehicle 100. For example, the communication device 110 communicates with the remote operator terminal 200 and the management device 300.

The sensor group 120 includes a recognition sensor, a vehicle state sensor, a position sensor, and the like. The recognition sensor recognizes (detects) a situation around the vehicle 100. Examples of the recognition sensor include the camera, a laser imaging detection and ranging (LIDAR), a radar, and the like. The vehicle state sensor detects a state of the vehicle 100. Examples of the vehicle state sensor include a speed sensor, an acceleration sensor, a yaw rate sensor, a steering angle sensor, and the like. The position sensor detects a position and an orientation of the vehicle 100. For example, the position sensor includes a global navigation satellite system (GNSS).

The travel device 130 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 150 is a computer that controls the vehicle 100. The control device 150 includes one or more processors 160 (hereinafter simply referred to as a processor 160) and one or more memory devices 170 (hereinafter simply referred to as a memory device 170). The processor 160 executes a variety of processing. For example, the processor 160 includes a central processing unit (CPU). The memory device 170 stores a variety of information necessary for the processing by the processor 160. Examples of the memory device 170 include a volatile memory, a non-volatile memory, a hard disk drive (HDD), a solid state drive (SSD), and the like. The control device 150 may include one or more electronic control units (ECUs).

A vehicle control program PROG1 is a computer program executed by the processor 160. The functions of the control device 150 are implemented by the processor 160 executing the vehicle control program PROG1. The vehicle control program PROG1 is stored in the memory device 170. The vehicle control program PROG1 may be recorded on a non-transitory computer-readable recording medium.

3-2. Driving Environment Information

The control device 150 uses the sensor group 120 to acquire driving environment information ENV indicating a driving environment for the vehicle 100. The driving environment information ENV is stored in the memory device 170.

The driving environment information ENV includes surrounding situation information indicating a result of recognition by the recognition sensor. For example, the surrounding situation information includes the image information captured by the camera. The surrounding situation information further includes object information regarding an object around the vehicle 100. Examples of the object around the vehicle 100 include a pedestrian, another vehicle (e.g., a preceding vehicle, a parked vehicle, etc.), a white line, a traffic signal, a sign, a roadside structure, and the like. The object information indicates a relative position and a relative velocity of the object with respect to the vehicle 100.

In addition, the driving environment information ENV includes vehicle state information indicating the vehicle state detected by the vehicle state sensor.

Furthermore, the driving environment information ENV includes vehicle position information indicating the position and the orientation of the vehicle 100. The vehicle position information is acquired by the position sensor. Highly accurate vehicle position information may be acquired by performing a well-known localization using map information and the surrounding situation information (the object information).

3-3. Vehicle Travel Control

The control device 150 executes vehicle travel control that controls travel of the vehicle 100. The vehicle travel control includes steering control, driving control, and braking control. The control device 150 executes the vehicle travel control by controlling the travel device 130 (i.e., the steering device, the driving device, and the braking device).

The control device 150 may execute autonomous driving control based on the driving environment information ENV. More specifically, the control device 150 generates a travel plan of the vehicle 100 based on the driving environment information ENV. Further, the control device 150 generates, based on the driving environment information ENV, a target trajectory required for the vehicle 100 to travel in accordance with the travel plan. The target trajectory includes a target position and a target speed. Then, the control device 150 executes the vehicle travel control such that the vehicle 100 follows the target trajectory.

3-4. Processing Related to Remote Operation

Hereinafter, the case where the remote operation of the vehicle 100 is performed will be described. The control device 150 communicates with the remote operator terminal 200 via the communication device 110.

The control device 150 transmits the vehicle information VCL to the remote operator terminal 200. The vehicle information VCL is information necessary for the remote operation by the remote operator O, and includes at least a part of the driving environment information ENV described above. For example, the vehicle information VCL includes the surrounding situation information (especially, the image information). The vehicle information VCL may further include the vehicle state information and the vehicle position information.

In addition, the control device 150 receives the remote operation information OPE from the remote operator terminal 200. The remote operation information OPE is information regarding the remote operation by the remote operator O. For example, the remote operation information OPE includes an amount of operation performed by the remote operator O. The control device 150 performs the vehicle travel control in accordance with the received remote operation information OPE.

Furthermore, the control device 150 may include the communication abnormality determination unit 10-1 described above. The communication abnormality determination unit 10-1 performs the communication abnormality determination process described above (see Section 2). When the occurrence of the communication abnormality is detected, the communication abnormality determination unit 10-1 performs the abnormality notification process that notifies the management device 300 of the communication abnormality flag FL indicating the occurrence of the communication abnormality.

4. Example of Remote Operator Terminal

Figure 12:
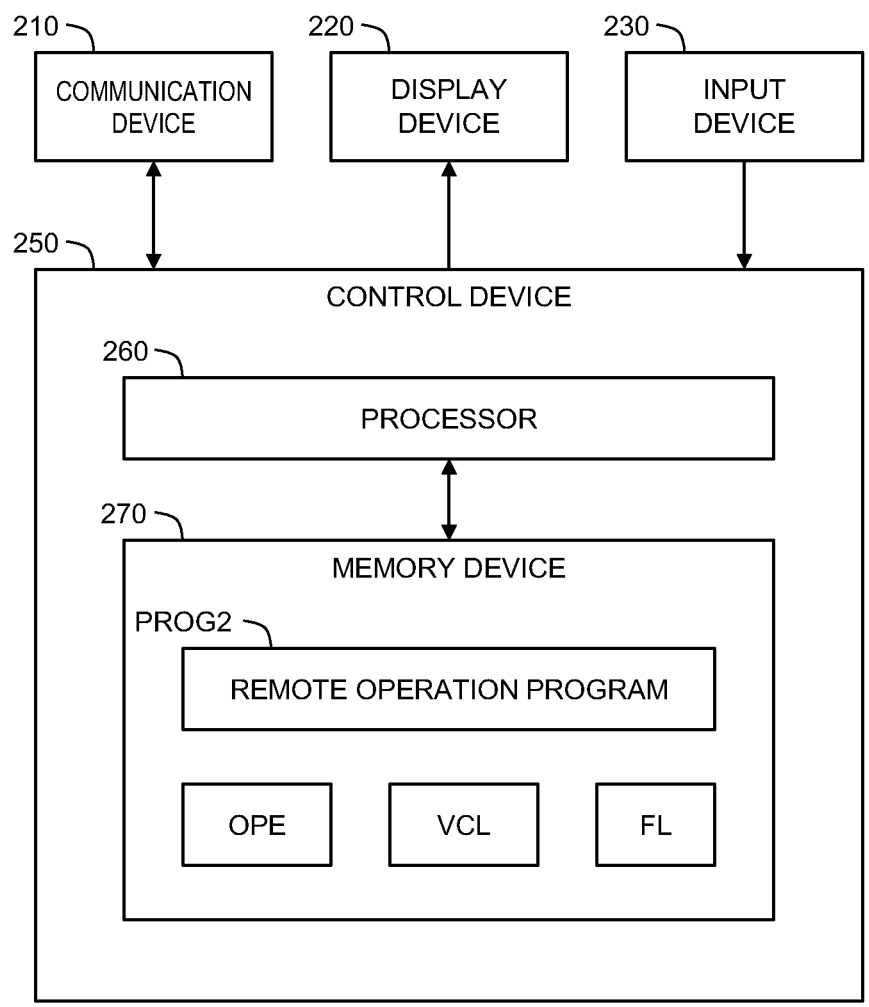
FIG. 12 is a block diagram showing a configuration example of a remote operator terminal according to an embodiment of the present disclosure.

FIG. 12 is a block diagram showing a configuration example of the remote operator terminal 200. The remote operator terminal 200 includes a communications device 210, a display 220, an input device 230, and a control device (controller) 250.

The communication device 210 communicates with the vehicle 100 and the management device 300.

The display device 220 presents a variety of information to the remote operator O by displaying the variety of information.

The input device 230 receives an input from the remote operator O. For example, the input device 230 includes a remote operation member that is operated by the remote operator O when remotely operating the vehicle 100. The remote operation member includes a steering wheel, an accelerator pedal, a brake pedal, a direction indicator, and the like.

The control device 250 controls the remote operator terminal 200. The control device 250 includes one or more processors 260 (hereinafter simply referred to as a processor 260) and one or more memory devices 270 (hereinafter simply referred to as a memory device 270). The processor 260 executes a variety of processing. For example, the processor 260 includes a CPU. The memory device 270 stores a variety of information necessary for the processing by the processor 260. Examples of the memory device 270 include a volatile memory, a non-volatile memory, an HDD, an SSD, and the like.

A remote operation program PROG2 is a computer program executed by the processor 260. The functions of the control device 250 are implemented by the processor 260 executing the remote operation program PROG2. The remote operation program PROG2 is stored in the memory device 270. The remote operation program PROG2 may be recorded on a non-transitory computer-readable recording medium. The remote operation program PROG2 may be provided via a network.

The control device 250 communicates with the vehicle 100 via the communication device 210. The control device 250 receives the vehicle information VCL transmitted from the vehicle 100. The control device 250 presents the vehicle information VCL to the remote operator O by displaying the vehicle information VCL including the image information on the display device. The remote operator O is able to recognize the state of the vehicle 100 and the situation around the vehicle 100 based on the vehicle information VCL displayed on the display device.

The remote operator O operates the remote operation member of the input device 230. An operation amount of the remote operation member is detected by a sensor installed on the remote operation member. The control device 250 generates the remote operation information OPE reflecting the operation amount of the remote operation member operated by the remote operator O. Then, the control device 250 transmits the remote operation information OPE to the vehicle 100 via the communication device 210.

Furthermore, the control device 250 may include the communication abnormality determination unit 10-2 described above. The communication abnormality determination unit 10-2 performs the communication abnormality determination process described above (see Section 2). When the occurrence of the communication abnormality is detected, the communication abnormality determination unit 10-2 performs the abnormality notification process that notifies the management device 300 of the communication abnormality flag FL indicating the occurrence of the communication abnormality.

5. Example of Management Device

Figure 13:
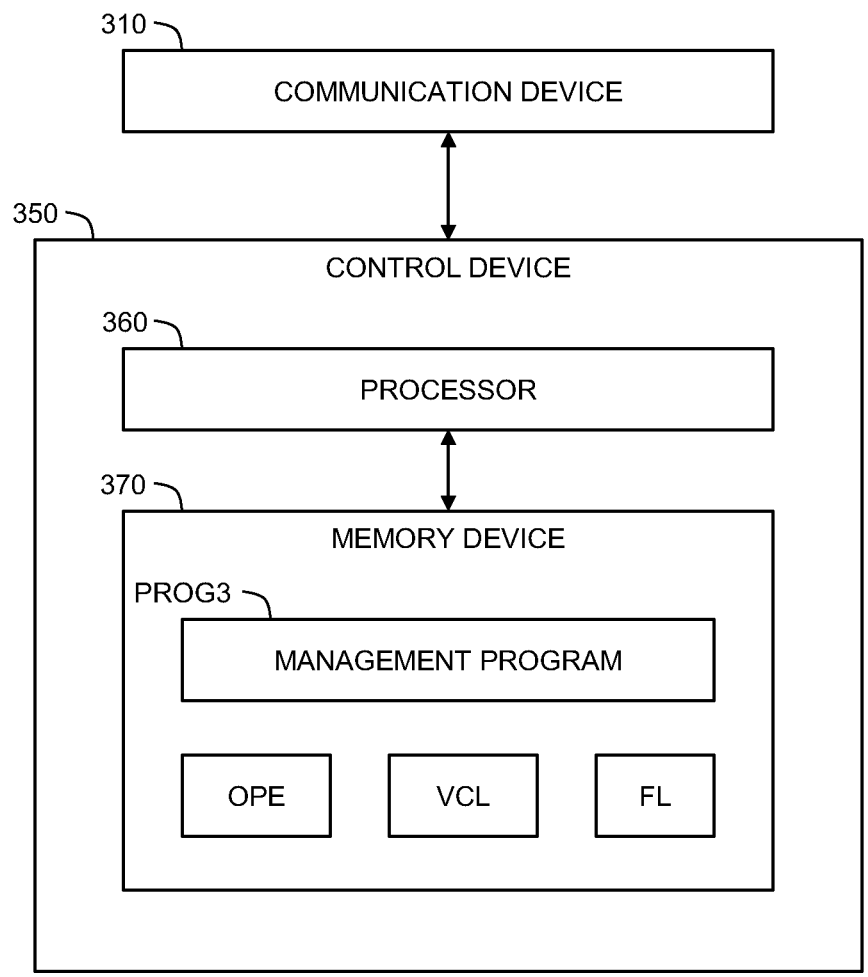
FIG. 13 is a block diagram showing a configuration example of a management device according to an embodiment of the present disclosure.

FIG. 13 is a block diagram showing a configuration example of the management device 300. The management device 300 includes a communication device 310 and a control device (controller) 350.

The communication device 310 communicates with the vehicle 100 and the remote operator terminal 200.

The control device 350 controls the management device 300. The control device 350 includes one or more processors 360 (hereinafter simply referred to as a processor 360) and one or more memory devices 370 (hereinafter simply referred to as a memory device 370). The processor 360 executes a variety of processing. For example, the processor 360 includes a CPU. The memory device 370 stores a variety of information necessary for the processing by the processor 360. Examples of the memory device 370 include a volatile memory, a non-volatile memory, an HDD, an SSD, and the like.

A management program PROG3 is a computer program executed by the processor 360. The functions of the control device 350 are implemented by the processor 360 executing the management program PROG3. The management program PROG3 is stored in the memory device 370. The management program PROG3 may be recorded on a non-transitory computer-readable recording medium. The management program PROG3 may be provided via a network.

The control device 350 communicates with the vehicle 100 and the remote operator terminal 200 via the communication device 310. The control device 350 receives the vehicle information VCL transmitted from the vehicle 100. Then, the control device 350 transmits the received vehicle information VCL to the remote operator terminal 200. In addition, the control device 350 receives the remote operation information OPE transmitted from the remote operator terminal 200. Then, the control device 350 transmits the received remote operation information OPE to the vehicle 100.

Furthermore, the control device 350 includes the communication abnormality determination unit 10 (10-3) described above. The communication abnormality determination unit 10 performs the communication abnormality determination process described above (see Section 2). When the occurrence of the communication abnormality is detected, the communication abnormality determination unit 10 performs the abnormality notification process that notifies the vehicle 100 and/or the remote operator terminal 200 of the communication abnormality flag FL indicating the occurrence of the communication abnormality.

What is claimed is:

1. A management device that communicates with a moving body being a target of a remote operation performed by a remote operator and a remote operator terminal on a side of the remote operator,
the management device comprising one or more processors located outside the moving body and the remote operator terminal,
the one or more processors being configured to:
during the remote operation of the moving body, receive first information related to the remote operation from a first device that is one of the moving body and the remote operator terminal, and transmit the first information to a second device that is another of the moving body and the remote operator terminal;
execute a communication abnormality determination process that determines whether or not an abnormality occurs in a first communication from the first device to the management device during the remote operation of the moving body based on a communication state of the first information; and
when it is determined that the abnormality occurs in the first communication during the remote operation of the moving body, notify the first device on a transmission side of the first communication of occurrence of the abnormality in the first communication,
wherein the remote operator terminal is configured to control the operation of the moving body through the first communication.

2. The management device according to claim 1, wherein the one or more processors are further configured to notify the second device of the occurrence of the abnormality in the first communication.

3. The management device according to claim 1, wherein the communication abnormality determination process includes:
acquiring a delay amount of the first communication based on the first information received from the first device; and
when the delay amount exceeds a threshold value, determining that the abnormality occurs in the first communication.

4. The management device according to claim 1, wherein the abnormality comprises an abnormality that occurs in an uplink communication from the first device to the management device.

5. The management device according to claim 1, wherein the communication abnormality determination process comprises:
- acquiring a delay amount of the first communication based on the first information received from the first device;
- determining whether the delay amount exceeds a first threshold value;
- based on the delay amount being determined to exceed the first threshold value, determining that the abnormality occurs in the first communication;
- determining whether the delay amount exceeds a second threshold value, the second threshold value being less than the first threshold value; and
- based on the delay amount being determined not to exceed the second threshold value, determining that the abnormality does not occur in the first communication.

6. The management device according to claim 5, wherein the determining whether the delay amount exceeds the second threshold value is performed after and based on determining that the delay amount does not exceed the first threshold value.

7. The management device according to claim 6, wherein the communication abnormality determination process further comprises:
- based on the delay amount being determined to not exceed the first threshold value and being determined to exceed the second threshold value, determining whether a state in which the delay amount exceeds the second threshold value continues for at least a predetermined amount of time; and
- based on determining that the state in which the delay amount exceeds the second threshold value continues for at least the predetermined amount of time, determining that the abnormality occurs in the first communication.

8. The management device according to claim 1, wherein, in a state in which the first device is the moving body, the first information comprises information about an operating state of the moving body, and
in a state in which the first device is the remote operator terminal, the first information comprises information about the remote operation of the moving body by the remote operator.

9. A remote operation system comprising:
- a moving body being a target of a remote operation performed by a remote operator;
- a remote operator terminal on a side of the remote operator; and
- a management device located outside the moving body and the remote operator terminal and configured to communicate with the moving body and the remote operator terminal, wherein
the management device is further configured to:
during the remote operation of the moving body, receive first information related to the remote operation from a first device that is one of the moving body and the remote operator terminal, and transmit the first information to a second device that is another of the moving body and the remote operator terminal;
execute a first communication abnormality determination process that determines whether or not an abnormality occurs in a first communication from the first device to the management device during the remote operation of the moving body based on a communication state of the first information; and
when it is determined that the abnormality occurs in the first communication during the remote operation of the moving body, notify the first device on a transmission side of the first communication of occurrence of the abnormality in the first communication,
wherein the remote operator terminal is configured to control the operation of the moving body through the first communication.

10. The remote operation system according to claim 9, wherein
the second device is configured to:
execute a second communication abnormality determination process that determines whether or not an abnormality occurs in a second communication from the management device to the second device based on a communication state of the first information; and
when it is determined that the abnormality occurs in the second communication, notify the management device of occurrence of the abnormality in the second communication.

11. A management method for managing a remote operation system including a moving body being a target of a remote operation performed by a remote operator and a remote operator terminal on a side of the remote operator, the management method comprising:
during the remote operation of the moving body, transmitting first information related to the remote operation from a first device that is one of the moving body and the remote operator terminal to a management device located outside the moving body and the remote operator terminal, and further transmitting the first information from the management device to a second device that is another of the moving body and the remote operator terminal;
executing, by the management device, a communication abnormality determination process that determines whether or not an abnormality occurs in a first communication from the first device to the management device during the remote operation of the moving body, based on a communication state of the first information; and
when it is determined that the abnormality occurs in the first communication during the remote operation of the moving body, notifying, by the management device, the first device on a transmission side of the first communication of occurrence of the abnormality in the first communication,
wherein the remote operator terminal is configured to control the operation of the moving body through the first communication.

12. The management method according to claim 11, further comprising:
executing, by the second device, a second communication abnormality determination process that determines whether or not occurs an abnormality in a second communication from the management device to the second device based on a communication state of the first information; and
when it is determined that the abnormality occurs in the second communication, notifying, by the second device, the management device of occurrence of the abnormality in the second communication.

* * * * *